Aug. 19, 1952     P. R. AUERBACH     2,607,254
TOOLHOLDER
Filed Jan. 21, 1948
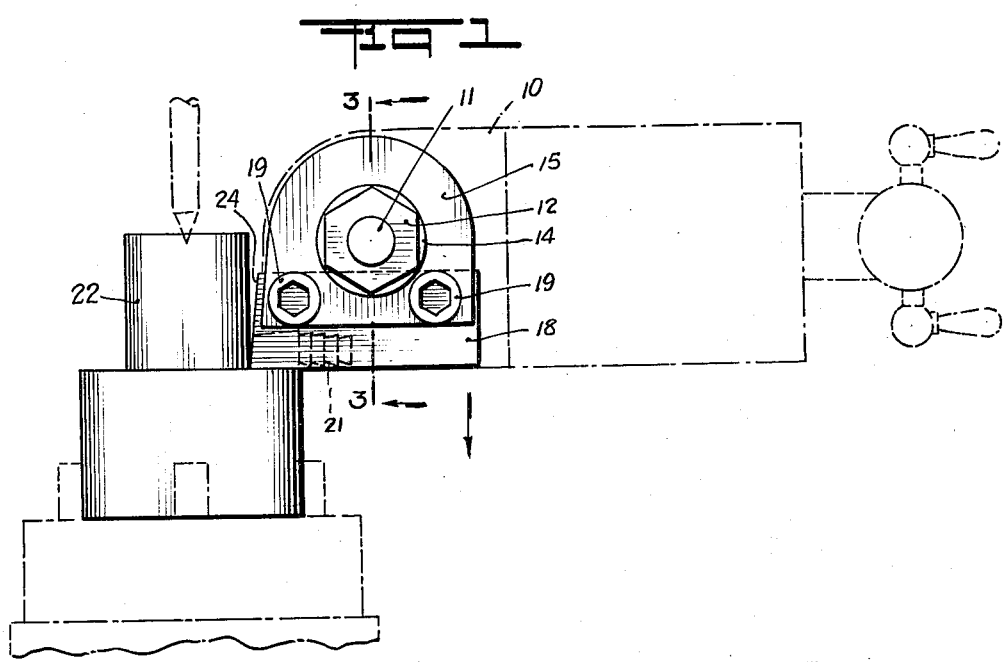
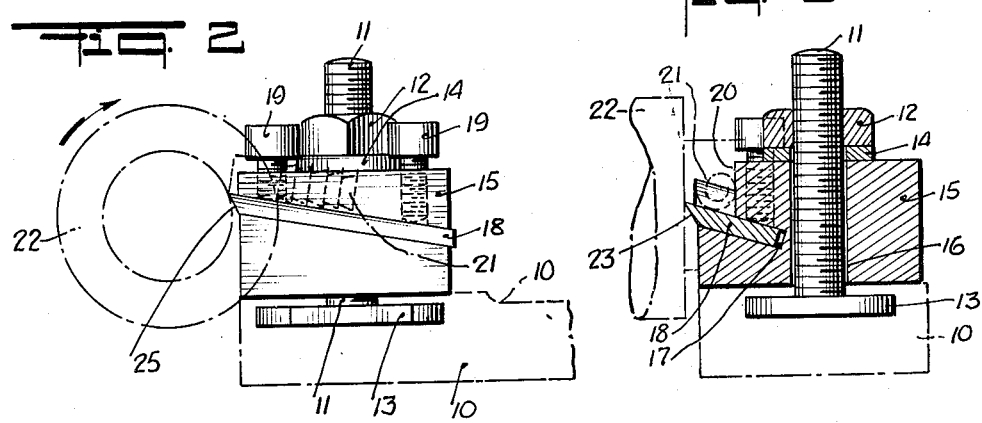
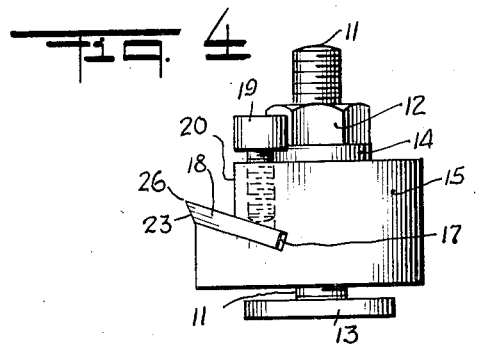
INVENTOR.
Philip R. Auerbach
BY
Irving Seidman
ATTORNEY Patented Aug. 19, 1952

2,607,254

UNITED STATES PATENT OFFICE 2,607,254

TOOLHOLDER

Philip R. Auerbach, Bronx, N. Y.

Application January 21, 1948, Serial No. 3,383

1 Claim. (Cl. 82—37)

This invention relates to an improved tool holder in order to provide a more rigid means of mounting a cutting tool within a block for use on a cutting machine such as a lathe, shaper and the like.

Broadly, it is an object of my invention to provide a firm and solid support for a cutting tool so that there is virtually no overhang of the tool except for necessary clearance. By having the block or tool holder positioned directly over the compound rest the resiliency, vibration and spring is reduced to a minimum if not entirely eliminated. Furthermore, all play in the compound rest is eliminated since the force of the cutting pressure is exerted directly upon the base of the slide, thus eliminating vibration, chatter and hogging-in so that a greater depth of cut is permissible. Since the cutting tool is rigidly supported, the cutting tool may be set at a more acute cutting angle than heretofore has been possible.

A further object of the invention is to provide a tool holder which can be placed at an acute cutting angle to permit a greater depth of cut without quickly destroying or chipping the keenness of the cutting edge. Since vibration is virtually eliminated a much heavier cut can be taken thus increasing the capacity of the machine. Also finer finishes may be attained with a much greater degree of accuracy; in fact, the finish obtained is of such quality that in most instances a final finishing cut may be eliminated.

Another object of the invention is to provide a tool holder in which the cutting tool need not be of heavy gauge steel since the cutting tool is firmly supported in the tool holder thus reducing the cost of the cutters. Furthermore, the type of cutting tool used can be more quickly and easily sharpened thus saving time and energy.

My invention also has for its object a solid and simple tool holder which permits a greater pressure on the tool or tool holder than those currently in use. In addition, the tool holder is so constructed that greater accuracy both in setting of the cutting tool and in the finish of the work may be obtained.

For a fuller understanding of the nature and objects of the invention, reference is had to the following detailed description in connection with the accompanying drawings, in which:

Fig. 1 is a top view of the cutting tool and tool holder showing a cutting being taken from a metal workpiece.

Fig. 2 is a front view of the tool holder and cutter shown in Fig. 1.

Fig. 3 is a section taken through line 3—3 of Fig. 1.

Fig. 4 is a side view of the tool holder and cutter shown in Figs. 1 and 2.

Referring to the drawings, numeral 10 represents a portion of the lathe compound or bedplate and is provided with a slot to receive the threaded post 11. Post 11 is slideably held in the slot by tightening the nut 12 which tightens the flange 13 against the bedplate 10. A washer 14 is seated beneath the nut 12 upon the threaded post 11.

A block 15 having a vertical hole 16 therethrough for the passage of the post 11 is provided with a slot 17 cut at an angle for receiving a cutter 18. The angular slot 17 is so cut that an angle is provided at both the front of the block 15 and the opposed sides of the block 15 in order to give the cutter 18 the necessary back and side rake. The cutter 18 is rigidly positioned in the slot 17 by the use of screws 19 at both sides of the block 15.

The cutter 18 may be easily ground and reground and still remain at the center height of the lathe by moving the cutter 18 in its angular slot 17 to its previous position and again securing it by tightening the screws 19. The hole 16 may be in the form of a slot so that the block 15 may be positioned as near to the center of the lathe compound or bedplate 10 as is practicable. As heretofore stated nut 12 is used to tighten block 15 in any such desired position.

It should be noted that the front face 20 of the upper portion of the block 15 above the slot 17 is recessed to provide a space for the chip 21 to move along as it is removed from the workpiece 22 so that the chip can be easily removed.

The cutter 18 may be a thin piece of hardened steel having its front edge 23 ground at an angle as shown in Figs. 3 and 4 and its side or end 24 ground at an angle less than 90 degrees, as shown in Fig. 1 for the purpose of clearing the workpiece 22. End 24 of the cutter is also ground at an angle as shown at 25 in Fig. 2. When the cutter 18 is cutting a wide chip 21 from the workpiece 22 the top cutting edge 26 of the front clearance edge 23 is actually cutting the chip 21 from the workpiece 22. The angular edge 24 of the cutter 18, since it is less than 90 degrees, permits the cutter 18 and block 15 to move in the direction of the arrow shown in Fig. 1 without interfering with the portion of the workpiece 22 being cut to narrower diameter while the angular slot 17 which positions the cutter 18 at an angle permits the chip 21 which is helically formed to move along the top of the cutter 18 and within the space provided by the recessed front 20 of the block 15. The rigidity with which the cutter 18 is held within the block 15, the angular position of the cuttter 18 and the angular cutting edge 26 which is supported by the base of the block 15 prevents possibility of undercutting either with a down pull, a creeping or side movement of the device. Since the block 15 is positioned directly over the compound 10 vibration and resiliency is at a minimum and greatly adds to the strength and cutting capacity of the cutter 18.

The overhang of the cutter 18 is practically eliminated and the depth of cut that is possible with the cutter so positioned and rigidly held permits more rapid cutting and performs the operations which would be required by a complete set of screw type holders presently used.

By the use of my device short pieces of steel can be used as efficiently as long pieces and the cutting steel can be much thinner than heretofore used and more easily ground and reground. This results in a material saving both in the cost of steel and the time of grinding and enables the use of scientifically tempered factory steel. My tool holder also reduces maintenance expense and the cutting edge on the cutter 18 has a longer life since vibration is eliminated.

It is obvious that various changes and modifications may be made in the details of construction and arrangement of parts without departing from the general spirit of the invention.

I claim:

In a tool holder for metal cutting machines having a bedplate, a substantially rectangular shaped block secured on the bedplate, said block having a straight front face and opposed side faces and being formed with a slot that extends inwardly from the intermediate portion of the front face in a rearwardly and downwardly inclined direction for the full width of the block, said slot being inclined from one side face of the block to the opposite side face, a cutter element having an elongated front cutting edge disposed in said slot for the full width thereof with its cutting edge protruding beyond the front face of the block, means for securing the cutter element in said slot, the upper front wall of the block being cut away above the slot for its full width for chip clearance.

PHILIP R. AUERBACH.

REFERENCES CITED

The following references are of record in the file of this patent:

UNITED STATES PATENTS

| Number | Name | Date |
| --- | --- | --- |
| 709,693 | Back | Sept. 23, 1902 |
| 733,391 | Hanson | July 14, 1903 |
| 811,786 | Miller | Feb. 6, 1906 |
| 1,020,493 | Hartness | Mar. 19, 1912 |
| 1,168,428 | Saum | Jan. 18, 1916 |
| 1,294,638 | Draper | Feb. 18, 1919 |
| 1,895,057 | Von Frommer | Jan. 24, 1933 |

FOREIGN PATENTS

| Number | Country | Date |
| --- | --- | --- |
| 147,041 | Great Britain | July 28, 1921 |